(12) United States Patent
Huang et al.

(10) Patent No.: US 11,823,850 B1
(45) Date of Patent: Nov. 21, 2023

(54) INFORMATION HANDLING SYSTEM KEYBOARD BACKLIGHT HAVING MINI-LED INTEGRATED LIGHT GUIDE ARRANGEMENT

(71) Applicant: Dell Products L.P., Round Rock, TX (US)

(72) Inventors: Wen-Pin Huang, New Taipei (TW); Hsien-Tsan Chang, Taoyuan (TW); Yi-Chen Wang, Taiwan (TW); Po-Chun Hou, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/976,059

(22) Filed: Oct. 28, 2022

(51) Int. Cl.
| | |
|---|---|
| *G06F 3/033* | (2013.01) |
| *H01H 13/83* | (2006.01) |
| *G06F 1/16* | (2006.01) |
| *G06F 3/02* | (2006.01) |
| *F21V 8/00* | (2006.01) |
| *G06F 3/023* | (2006.01) |

(52) U.S. Cl.
CPC .......... *H01H 13/83* (2013.01); *G02B 6/0055* (2013.01); *G02B 6/0065* (2013.01); *G06F 1/1662* (2013.01); *G06F 3/0202* (2013.01); *G06F 3/023* (2013.01); *H01H 2219/06* (2013.01); *H01H 2219/062* (2013.01)

(58) Field of Classification Search
CPC ............... H01H 13/83; H01H 2219/06; H01H 2219/062; G02B 6/0055; G02B 6/0065; G06F 1/1662; G06F 3/0202; G06F 3/023
USPC ................................ 345/170, 171, 172, 168
See application file for complete search history.

(56) References Cited

U.S. PATENT DOCUMENTS

| | | | | |
|---|---|---|---|---|
| 4,689,753 | A * | 8/1987 | Cameron | .............. G06F 15/025 702/22 |
| 6,667,762 | B1 * | 12/2003 | Bouvier | ............. G01N 21/8806 348/92 |
| 7,283,066 | B2 | 10/2007 | Shipman | |
| 7,364,337 | B2 | 4/2008 | Park | |
| 7,839,379 | B1 | 11/2010 | Kerr et al. | |
| 2005/0254812 | A1* | 11/2005 | Kosaka | .................. G03B 15/05 348/E5.025 |
| 2013/0265740 | A1* | 10/2013 | Lee | ........................ G06F 3/0202 362/23.03 |

(Continued)

OTHER PUBLICATIONS

Myfixguide, "New Backlit Keyboard for Asus ROG Zephyrus M16 GU603HE GU603HM GU603HR GU603ZE GU603ZM GU603ZW GU603ZX 2021 2022," downloaded from https://www.myfixguide.com/store/keyboard-for-asus-rog-zephyrus-m16/ on Apr. 14, 2023, 6 pages.

*Primary Examiner* — Thuy N Pardo
(74) *Attorney, Agent, or Firm* — ZAGORIN CAVE LLP; Robert W. Holland

(57) ABSTRACT

An information handling system keyboard backlight illuminates with a single mini-LED disposed under each of plural keyboard keys and having a penta directional illumination that illuminates directly at the key and coplanar a light guide material around the perimeter of the mini-LED. The light guide material in cooperation with a reflector below and a mask above provides indirect illumination at the periphery of the key for a more uniform key illumination. A substrate carried with circuits below the mini-LED powers the mini-LED so that a more bulky flexible printed circuit is not needed.

19 Claims, 3 Drawing Sheets

(56) References Cited

U.S. PATENT DOCUMENTS

| | | | |
|---|---|---|---|
| 2013/0265741 A1* | 10/2013 | Lee | G06F 3/04895 |
| | | | 362/23.03 |
| 2014/0225835 A1 | 8/2014 | Pance et al. | |
| 2017/0294278 A1* | 10/2017 | Chen | H01H 13/023 |
| 2018/0059803 A1* | 3/2018 | Anikejenko | G06F 3/021 |
| 2019/0056797 A1* | 2/2019 | Moon | G06F 3/03547 |
| 2019/0115171 A1* | 4/2019 | Chiang | H01H 13/702 |
| 2019/0138738 A1* | 5/2019 | Ricknäs | G06F 21/32 |
| 2022/0294444 A1* | 9/2022 | Liu | G06F 1/1662 |

* cited by examiner

INFORMATION HANDLING SYSTEM KEYBOARD BACKLIGHT HAVING MINI-LED INTEGRATED LIGHT GUIDE ARRANGEMENT

BACKGROUND OF THE INVENTION

Field of the Invention

The present invention relates in general to the field of information handling system keyboard illumination, and more particularly to an information handling system keyboard backlight having a mini-LED integrated light guide arrangement.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Often tablet information handling systems are transported in folding carriers that include a keyboard interfaced through BLUETOOTH. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Often portable information handling systems are used in dark locations, such as on an airplane or in a café. Typically, portable information handling systems include a backlight disposed under the keyboard to provide illumination of the keys so that an end user can see what keys are pressed. A conventional keyboard backlight has fairly powerful light emitting diodes (LEDs) arranged at one side and directed to illuminate into a light guide plate (LGP) disposed under the keyboard. The light guide plate has a translucent material that promotes dissipation of light across the area under the keyboard and a reflector that keeps light in the translucent material until the light proceeds out of the openings aligned with keyboard keys. Conventional keyboard backlights are effective at providing a well-distributed light across the keyboard, however, the side directed LEDs tend to have a relatively large power consumption, which can impact system battery life.

Mini LED's offer an alternative to the use of a conventional keyboard backlight with an LGP. The use of mini-LEDs placed under each of the keys of the keyboard to directly illuminate the keys from below provides the same level of brightness with a reduced keyboard backlight power consumption. Typically, each key will have a mini-LED below directed up at the bottom surface of the key. In some instances, each key will have multiple mini-LEDs, such as one mini-LED at each corner, to provide full illumination at the key bottom surface. One difficulty with this approach is that the direct illumination tends to leak at the sides of the keys as bright spots that impact end user viewing of the keyboard. Another difficulty is that power and cost increase for performing backlight illumination when multiple mini-LEDs illuminate each key.

SUMMARY OF THE INVENTION

Therefore, a need has arisen for a system and method which illuminates keyboard keys with direct and indirect illumination from mini-LEDs disposed below the keyboard keys.

In accordance with the present invention, a system and method are provided which substantially reduce the disadvantages and problems associated with previous methods and systems for illumination of keyboard keys. A mini-LED disposed under a keyboard key provides direct illumination at the key bottom surface and indirect illumination at the key periphery through a light guide material disposed around the mini-LED perimeter.

More specifically, a portable information handling system housing includes a processor that executes instructions to process information in cooperation with a memory that stores the instructions and information. A keyboard couples to the housing and has plural keys that accept end user presses to input values to the processor. The keyboard has a backlight assembly of plural mini-LEDs that provide backlight illumination of the plural keys with both direct illumination from the top side of each mini-LED directed at a key and also indirect illumination directed from the mini-LED through a light guide material, such as acrylic having a reflector and mask, and towards a periphery of the key. For example, the mini-LED is a penta directional LED that provides direct illumination from a top surface towards the key bottom surface and also provides illumination from the side surfaces towards the light guide material. In one embodiment, power is provided to an array of single mini-LEDs that each align with a key bottom surface through a PET membrane that has a reduced thickness compared with flexible printed circuit boards typically found in conventional keyboard backlights.

The present invention provides a number of important technical advantages. One example of an important technical advantage is that an information handling system keyboard backlight provides improved illumination with reduced hot spots and reduced power consumption by directing part but not all of the illumination from plural mini-LEDs through a light guide material so that the keyboard keys receive both direct and indirect illumination. In one example embodiment, the mini-LEDs are powered through a substrate carried with circuits. In one embodiment, at least one mini-LED is used at each of plural keys so that the backlight has a reduced cost and complexity with an improved battery life from reduced backlight power consumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system keyboard backlight assembly includes plural mini-LEDs that provide direct illumination to individual keys and indirect illumination directed through a light guide material to the key periphery. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
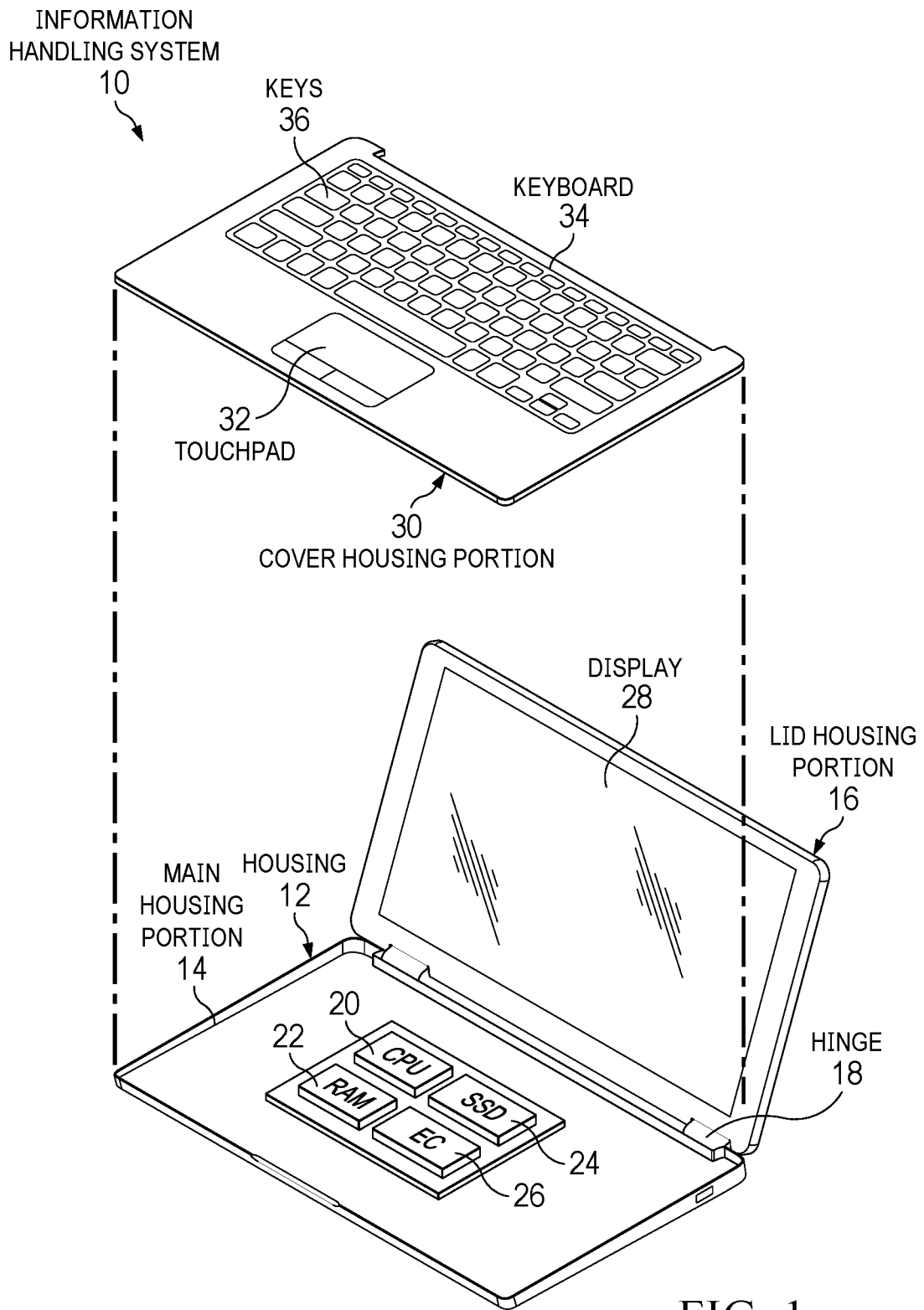
FIG. 1 depicts an exploded perspective view of a portable information handling system having an integrated keyboard with a backlight having direct and indirect key illumination.

Referring now to FIG. 1, an exploded perspective view depicts a portable information handling system 10 having an integrated keyboard 34 with a backlight having direct and indirect key illumination. In the example embodiment, portable information handling system 10 is built in a portable housing 12 having a clamshell configuration that rotates between open and closed positions. In the depicted open position, main housing portion 14 provides a base for the system to rest on a support surface and hinge 18 holds a lid housing portion 16 in a raised viewing position so that an integrated display 28 is viewable by an end user. Main housing portion 14 holds a variety of processing components that cooperate to process information, such as to generate visual images for presentation at display 28. A central processing unit (CPU) 20 executes instructions that process information in cooperation with a random access memory (RAM) 22 that stores the instructions and information. For example, an operating system and applications are retrieved from persistent storage, such as from a solid state drive (SSD) 24, to RAM 22 for execution on CPU 20 to perform processing tasks. An embedded controller 26 interfaces with CPU 20 to manage interactions of the processing components at a physical level. For example, embedded controller 26 manages application of power to processing components, thermal conditions within housing 12 and interactions with peripheral devices.

Portable information handling system 10 includes integrated inputs devices of a keyboard 34 and a touchpad 32 exposed at the upper surface of cover housing portion 30 that couples over main housing portion 14. Keyboard 34 has a plurality of keys, such as a QWERTY configuration, that accept key inputs as presses by an end user and reports the key inputs to CPU 20 through embedded controller 26. To aid end user interactions with keys 36, keyboard 34 includes a backlight that illuminates individual keys from below. For instance, each key has a value, such as letter or number, etched in the key upper surface so that illumination from below the key highlights the value for viewing by an end user. Illumination is provided by direct light from a mini-LED disposed under the key and indirect light that passes from the mini-LED through a light guide material, such as acrylic, to the periphery of the key. The illumination supports information handling use in dark locations, such as an airplane or coffee shop where portable information handling systems are commonly used. In alternative embodiments, other types of keyboards may be supported, such as peripheral keyboards that typically operate as separate devices from the portable information handling system housing or number pads. As another example, the keyboard backlight as described in greater detail below may be used in a tablet information handling system carrying case that includes an integrated keyboard.

Figure 2:
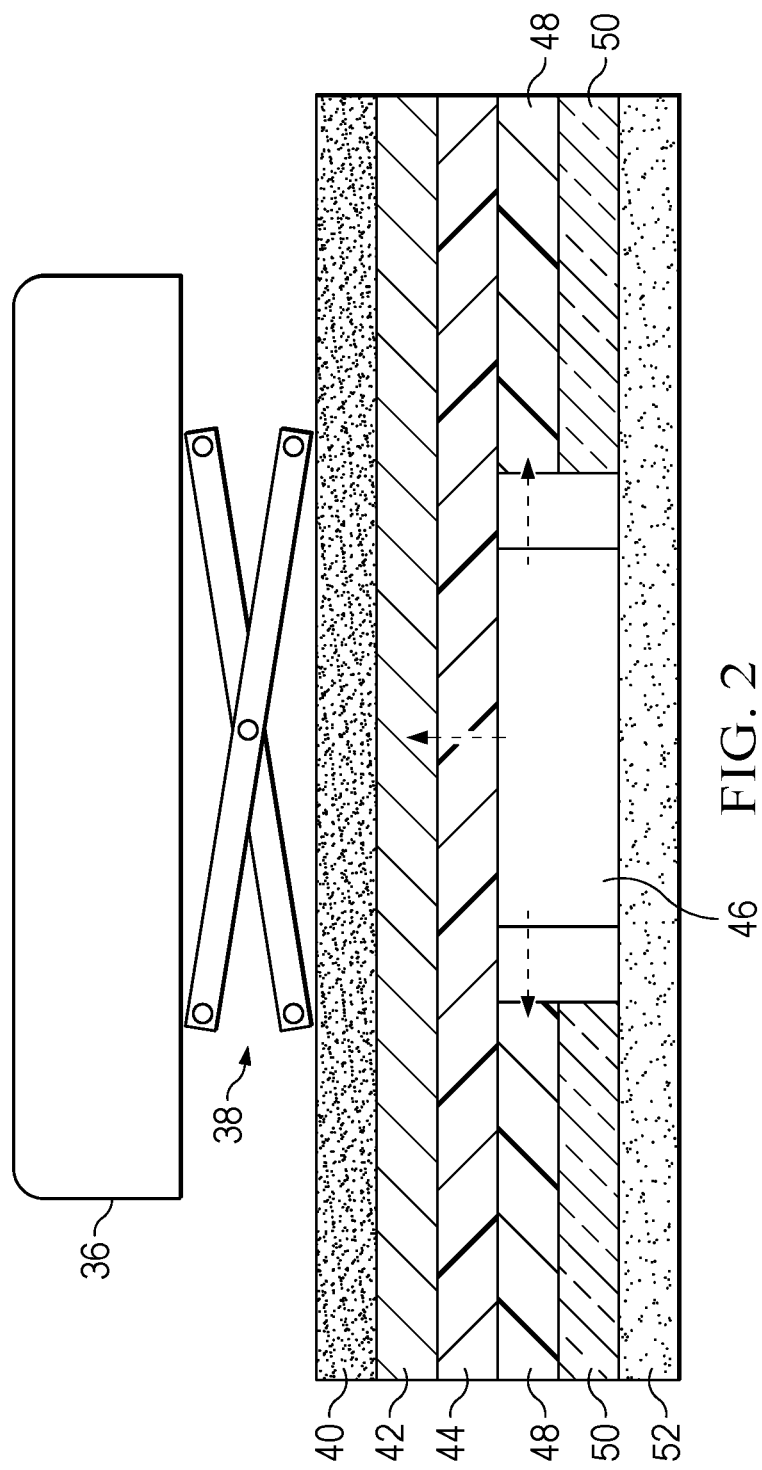
FIG. 2 depicts a side cutaway view of a keyboard backlight configuration that provides direct and indirect key illumination.

Referring now to FIG. 2, a side cutaway view depicts a keyboard backlight assembly that provides direct and indirect key illumination. In the example embodiment, key 36 is biased away from a keyboard contact detection membrane 40 by a biasing device, such as a scissor 38 held up with a spring, rubber dome or similar arrangement. Contact detection membrane 40 rests on a support plate 42, such as a sheet metal plate, so that a press of key 36 downwards to contact membrane 40 triggers an input at a contact switch in a conventional manner. The backlight assembly below plate 42 provides illumination to key 36 so that an end user can see the key value at the upper key surface in low light conditions. Although the present description relates to a conventional portable configuration for a keyboard key 36, the backlight assembly as described further below may be used in any of a variety of keyboards that have key illumination.

The backlight assembly has an upper side mask 44 that defines the locations where illumination is directed up towards key 36. Below mask 44, a penta directional light emitting diode (LED) 46 couples to a substrate carried with circuits 52 to provide white light for illumination of key 36. LED 46 at the upper surface provides direct illumination to the bottom surface of key 36, such as through an opening of mask 44. In this regard, LED 46 provides a conventional mini-LED illumination as known in the art to have illumination appropriate for direct illumination of a single key from below the key. However, LED 46 has a penta directional illumination so that light generated by the LED proceeds in all four directions perpendicular to key 36 and coplanar mask 44 and substrate 52. A light guide material 48, such as acrylic, placed over a reflector 50 is arranged around the perimeter of LED 46 to accept the coplanar illumination and direct the coplanar illumination towards the periphery of key 36. Mask 44 provides a path to pass illumination out of light guide material 48 to manage illumination around the periphery of key 36. This indirect illumination enhances the appearance of the keyboard to make the keys more visible while dampening and diffusing any hotspots from distracting viewing of the keyboard.

Figure 3:
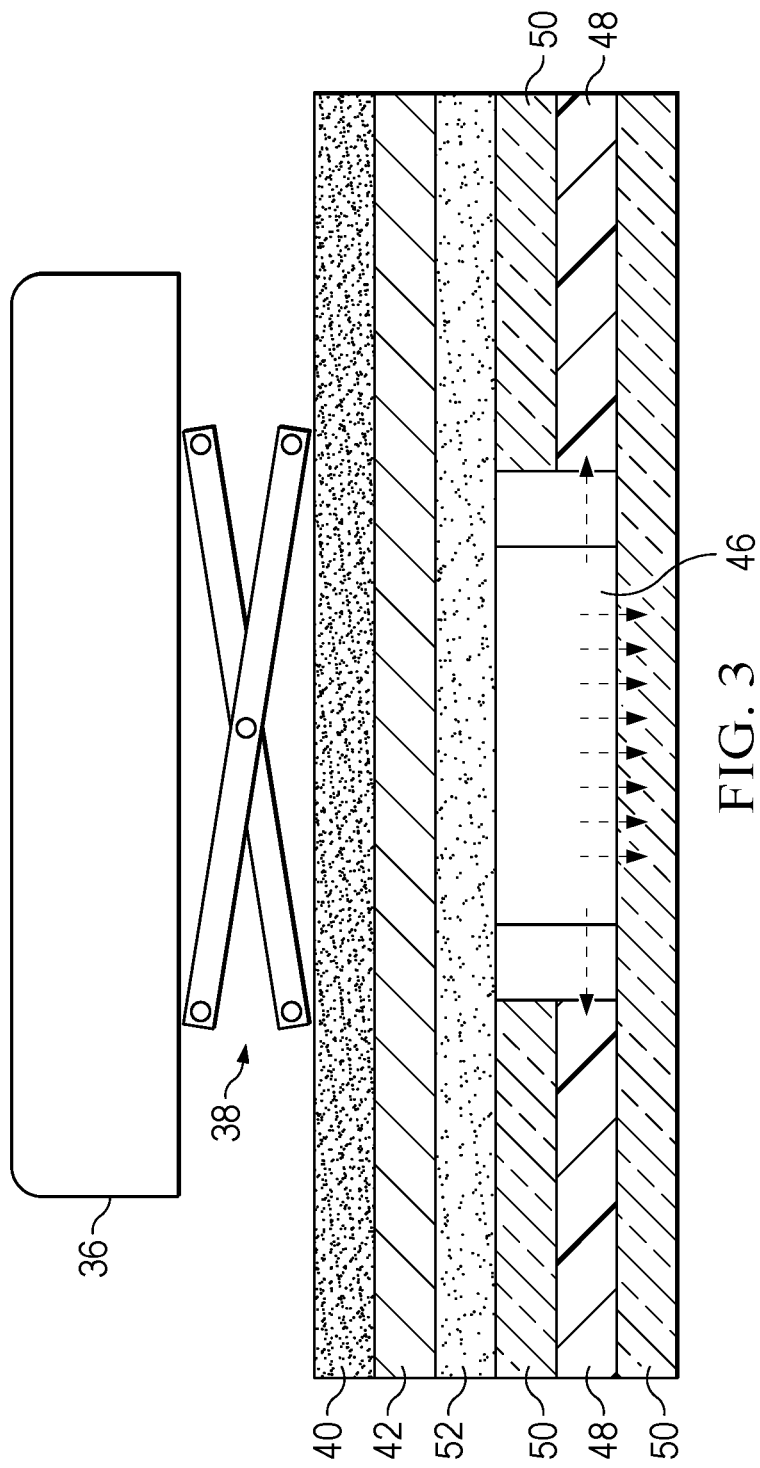
FIG. 3 depicts a side cutaway view of a keyboard backlight configuration that provides direct and indirect key illumination with a bottom-firing LED implementation.

Referring now to FIG. 3, a side cutaway view depicts a keyboard backlight configuration that provides direct and indirect key illumination with a bottom-firing LED implementation. Keyboard membrane 40 rests on support plate 42 to detect input presses by key 36 through scissors 38. An opening through the support plate and membrane allows light to pass from below for direct illumination of key 36. Substrate 52 provides power to LED 46, which has a bottom-firing orientation as indicate by the arrows. In the example, LED 46 has a penta directional configuration to provide illumination into light guide material 48, which is captured between upper and lower reflectors 50. Light guide material 48 directs illumination towards the perimeter of key 36 while avoiding direct illumination upwards that can result in hot spots.

In a variety of embodiments, different structures of the backlight assembly may be used. In the depicted example, the backlight assembly is a discrete and independent unit with a single LED under a single key. Each key of a keyboard that has illumination will have a discrete backlight assembly beneath the key. For example, a keyboard might have 70 or so independent and discrete backlight assemblies coupled to the substrate with each backlight assembly aligned under a key. An alternative embodiment couples the LEDs to the substrate to align with keys and then places a contiguous light guide over the substrate with an opening through the light guide at the location of each LED. In yet another embodiment, the light guide material encapsulates the micro LEDs and has an opening in the mask above each LED that allows direct illumination from the LED to the key bottom surface. The backlight assembly enhances illumination with full use of the light generated by the LED at each key so that less power is consumed to generate a desired amount of backlight illumination. In various embodiments, the substrate carried with the circuits may have a substrate material of PET, PI, PCD, BT and similar materials. The reflector may be a film or may be printed on the substrate or other similar types of reflectors.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory storing the instructions and information; and
   a keyboard coupled to the housing and interfaced with the processor, the keyboard having plural keys, each key accepting a key value as an input to the processor, at least one key having a backlight element disposed directly below the key, the backlight element having one penta-directional mini-LED to provide illumination directly at the one key bottom surface and a light guide material around a perimeter of the Penta-directional mini-LED to accept illumination from the Penta-directional mini-LED and direct the illumination towards a perimeter of the key.

2. The information handling system of claim 1 further comprising:
   at least one of the backlight elements disposed under each key of the keyboard.

3. The information handling system of claim 2 wherein each backlight element has a discrete and separate light guide material.

4. The information handling system of claim 2 wherein the light guide material comprises a contiguous sheet of material having an opening at each mini-LED.

5. The information handling system of claim 1 further comprising:
   a reflector disposed under the light guide material; and
   a mask disposed between the light guide material and the at least one key.

6. The information handling system of claim 5 wherein the penta-directional mini-LED provides illumination towards the key and in a plane parallel with the key and coplanar the light guide material.

7. The information handling system of claim 6 further comprising a substrate carried with circuits, the penta-directional mini-LED coupled to the substrate to receive power.

8. The information handling system of claim 7 further comprising:
   a touch detection membrane disposed below the key and operable to detect an input when the key presses down and against the touch detection membrane; and
   a biasing device biasing the key to a raised position above the membrane;
   wherein the Penta-directional mini-LED is disposed below the touch detection membrane.

9. The information handling system of claim 6 wherein the penta-directional mini-LED provides illumination without a flexible printed circuit board.

10. A method for illumination of an information handling system keyboard, the method comprising:
    coupling a penta-directional mini-LED below each of plural keys of the keyboard, the Penta-directional mini-LED directing illumination upward toward the key;
    disposing a light guide material around the side perimeter of the Penta-directional mini-LED; and
    directing at least some of the illumination of the penta-directional mini-LED through the light guide material to a periphery of the key.

11. The method of claim 10 further comprising:
disposing a reflector below the light guide material; and
disposing a mask above the light guide material, the mask configured to direct penta-directional mini-LED illumination at predetermined locations of the periphery of the key.

12. The method of claim 11 further comprising:
coupling the penta-directional mini-LED to a substrate carried with circuits; and
powering the penta-directional mini-LED through the substrate carried with circuits.

13. The method of claim 12 further comprising:
coupling the penta-directional mini-LED and the light guide material below each of the plural keys as a discrete and separate backlight assembly for each of the plural keys.

14. The method of claim 12 further comprising:
coupling the light guide material, the mask and the reflector to the substrate carried with circuits as a contiguous assembly having an opening for each penta-directional mini-LED.

15. The method of claim 10 wherein the penta directional LED provides direct illumination towards the key and indirect illumination in a plane parallel with the key and coplanar the light guide material.

16. The method of claim 15 wherein the light guide material comprises acrylic.

17. A keyboard comprising:
plural keys, each key accepting a key value as an input;
a backlight element disposed directly below at least one of the plural keys, the backlight element having one mini-LED to provide illumination directly at a bottom surface of the at least one of the plural keys and a light guide material around a perimeter of the mini-LED to accept illumination from the mini-LED and direct the illumination towards a perimeter of the key to provide indirect illumination of the at least one of the plural keys;
wherein the mini-LED comprises a penta directional LED providing illumination towards the key and in a plane parallel with the key coplanar the light guide material.

18. The keyboard of claim 17 wherein the light guide material comprises acrylic.

19. The keyboard of claim 17 further comprising:
a reflector disposed below the light guide material;
a mask disposed above the light guide material; and
a substrate carried with circuits disposed below the reflector and interfacing power with the mini-LED.

* * * * *